Patented June 15, 1954

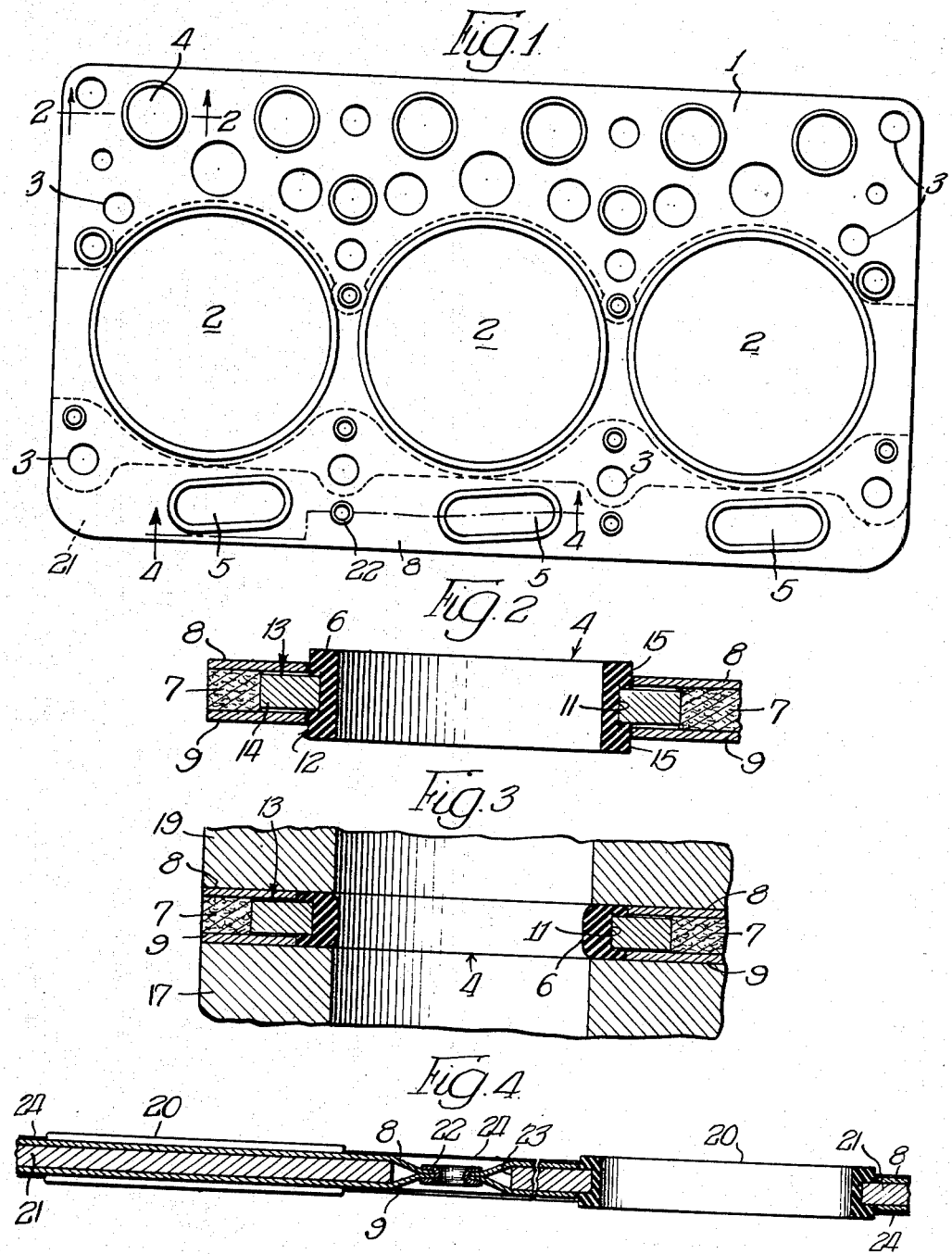

2,681,241

UNITED STATES PATENT OFFICE 2,681,241

CYLINDER HEAD GASKET

Albert J. Aukers, Chicago, Ill., assignor to Victor Manufacturing & Gasket Co., Chicago, Ill., a corporation of Illinois Application December 15, 1950, Serial No. 200,898

8 Claims. (Cl. 288—21)

This invention relates to grommets for insertion in a cylinder head gasket for internal combustion engines and has for its principal object the provision of a new and improved device of this kind.

It is a main object of the invention to provide an arrangement for securing a grommet in a gasket which insures that the forces compressing the gasket and grommet will act upon the grommet efficiently.

Another object of the invention is to provide a grommet for inclusion in a cylinder head gasket, which grommet is thicker than the gasket and is compressible with the gasket to form a tight seal between the cylinder head and block of an internal combustion engine.

Another object of the invention is to provide a grommet secured in a gasket by a plate that is thinner than the compressed thickness of the gasket so that forces of compression in the region of the grommet will be concentrated on the grommet.

Another object of the invention is to provide a gasket having grommets located between the bolt holes and edge of the gasket, which grommets are composed of compressible material, are thicker than the gasket and are located in a region that is thinner than the remainder of the gasket so that forces of compression in the region will be concentrated on the grommets to insure forming a tight seal.

Another object of the invention is to provide an improved way of securing a group of grommets in a cylinder head gasket.

Still another object of the invention is to provide a grommeted cylinder head gasket that can be manufactured at low cost without sacrificing quality.

Further objects not specifically mentioned here will be apparent from the detailed description and claims which follow, reference being had to the accompanying drawings in which a preferred embodiment of the invention is shown by way of example and in which Fig. 1 is a top plan view of a cylinder head gasket embodying grommets of this invention, with part of the gasket facing cut away to better show the invention;

Fig. 2 is an enlarged fragmentary view in vertical cross section taken along line 2—2 of Fig. 1;

Fig. 3 is a fragmentary view in vertical cross section through a grommet of the type shown in Fig. 2, in position and compressed between a cylinder head and block which have been drawn tight; and Fig. 4 is an enlarged fragmentary view in vertical cross section taken along line 4—4 of Fig. 1 and showing another embodiment of the invention.

In the prior art of which I am aware, difficulty has been encountered in preventing leakage around the openings in cylinder head gaskets through which fluids, such as water and oil, pass in flowing between the cylinder head and block. The leakage at these points results from the varied and nonuniform pressure imposed on the gasket area between the clamping bolts or studs and the outer edge of the gasket in which area said openings are located. In certain instances an oil hole through which oil is forced under pressure is also located between the stud line and the edge of the gasket, and the sealing of such oil has been particularly troublesome.

A successful means for eliminating this leakage is disclosed in my Patent No. 2,395,243 in which an all elastomer grommet, mounted in the cylinder head gasket by an annular flange portion extending into the body of the gasket around the openings, co-acts with the cylinder head and block to seal the passage therebetween. Such a grommet has proven to be an efficient means of preventing leakage around such openings.

However, in the manufacture of gaskets employing the grommets of my aforementioned patent, certain difficulty has been encountered in positioning the grommet in the gasket during assembly thereof. Furthermore, in many gaskets the close proximity of the asbestos or other gasketing material to the outer periphery of the grommet has resulted in the forces of compression being largely absorbed by the gasketing material rather than by the elastomer grommet surrounding the passageway, with a corresponding reduction in the sealing efficiency of said grommet. It is to correcting the above situations that the present invention is directed.

Referring more particularly to the embodiments shown in the accompanying drawings, it will be seen that Fig. 1 shows a cylinder head gasket 1 having the usual combustion openings 2, bolt holes 3, openings 4 for the passage of lubricant, and openings 5 for the passage of water or other coolants through the gasket. Grommets 6 are mounted in lubricant openings 4 and coolant openings 5. As can best be seen in Fig. 2, the gasket is basically of the well known metal-clad type in which a layer 7 of suitable gasketing material such as asbestos is encased between upper facing 8 and lower facing 9 which may be of any suitable metal such as sheet steel or copper.

The grommet 6 of this invention is preferably constructed of a compounded synthetic rubber or elastomer bonded to a metallic washer 13, said elastomer having oil, water and heat resistant characteristics satisfactory for the use intended and is mounted in the openings 4 or 5 in the manner hereinafter described. The grommet comprises an annular ring 6 containing an outwardly opening groove 11 that extends completely around the outer surface 12 of the ring. The ring 6 is bonded, preferably chemically, to a flat metal washer 13 which is disposed in the groove 11. The washer 13 is larger than the ring 6 and forms an outwardly extending flange 14 which extends into the gasket between facings 8 and 9 and securely holds the grommet in position surrounding opening 4.

The ring portion 6 of the grommet 6 is thicker than the gasket 1 and preferably centered vertically with respect to washer 13 thereby extending above and below the gasket surface as shown at 15.

The washer 13 of grommet 6 is made of sheet steel or other suitable metal and is thinner than the layer of gasketing material 7, as is apparent in Fig. 2. It has been found that for maximum sealing efficiency of the grommet, the washer 13 should be slightly thinner than the thickness to which the gasketing material 7 is compressed when the gasket 1 is positioned between a cylinder head and block and those members drawn down tight into operating position.

Since the grommets 6 are thicker than the remainder of the gasket when the gasket is registered with an engine block 17, the grommets will engage the block first. When the cylinder head 19 is registered with the block and gasket, it also first engages the grommets. As the cylinder head bolts or studs are drawn down, the grommets are compressed and the block and head brought into engagement with the facings 8 and 9 of the gasket, and further movement of the head compresses the gasket material 7 and the grommets. When the gasket material 7 is fully compressed and the head is in its final position on the block, the washers 13, being thinner than the compressed material 7, are not under pressure and consequently all pressures in the regions of the grommets are on the grommets themselves. This insures that the grommets will form fluid-tight seals between the block and head even though the head may warp some under the influence of the heat and pressure to which it may be subjected, this warping being greatest in the regions between the bolts and outer edges of the head.

Figs. 1 and 4 disclose an alternate construction advantageously used where several grommets are positioned in a single gasket in linear or substantially linear relation one to the other. In this embodiment of the invention, the several grommets 20 are located in a common plate 21 that is composed of metal such as sheet steel, to which the grommets are bonded. The plate 21 is the same thickness as the washers 13. The facing members 8 and 9 of the gasket extend over the plate 21 and the assembly is secured together by hollow rivets 22. The plate 21 contains perforations 23 through which the rivets 22 project, which perforations are larger than the rivet heads so that as the rivets are drawn tight the facings 8 and 9 will be drawn into the perforations.

As will be seen best in Fig. 4, the plate is thinner than the main portion 24 of the gasket and the heads of rivets 22 do not project beyond the upper and lower faces respectively of the facings 8 and 9. Grommets 20 are normally thicker than the gasket and as a result are compressed the same as grommets 6. It will be noted from Fig. 1 that the plate 21 lies entirely between the bolt holes 3 and the edge of the gasket; consequently when the head is drawn down tightly on the block, all pressure in the region between the bolts and edge of the head is on the grommets, and fluid-tight seals around the coolant openings 5 are assured. The tendency of the cylinder head to warp under the heat and pressure to which it is subjected, is greatest in the region between the bolt holes 3 and the edge of the head, that is, in the region of grommets 20. These grommets being relatively resilient are capable of maintaining a tight seal despite such warping, and leakage of coolant from the openings 5 is effectively prevented. The inclusion of several grommets 20 in a single plate 21 is further advantageous in that the cost of manufacture of the grommeted gasket is thereby reduced.

In the drawings, the grommets 6 are round and grommets 20 are oval shape, such shapes being shown by way of example only, as the teachings of the invention contemplate shaping the grommets as required to fit them to the many designs of cylinder heads and blocks encountered.

Having thus complied with the statutes and shown and described a preferred embodiment of my invention, what I consider new and desire to have protected by Letters Patent is pointed out in the appended claims.

What is claimed is:

1. The combination with a metal-faced cylinder head gasket having the usual combustion openings, water and stud holes, and an oil hole for transmitting oil under pressure to operating parts of an engine; of a grommet for the oil hole, comprising: a metal washer projecting between the gasket facings around the oil hole, and an elastomer annulus chemically bonded to the inside edge of said washer and defining said oil hole, said elastomer extending through openings in and equidistantly above and below the metal facings of the gasket.

2. A gasket as claimed in claim 1, in which the oil holes in the facings of the gasket are larger than the outside diameter of the elastomer to provide an annular space into which the elastomer may be displaced as it is compressed axially.

3. The combination with a gasket having a central member composed of a compressible gasket material and thin metal facings secured on the two faces of said material; of a grommet comprising an annulus of elastomer having an outwardly opening groove centered in its outer face and extending completely around the annulus, and a metal plate fitted in said groove and extending outwardly therefrom, to which plate the elastomer is chemically bonded, said annulus having greater thickness than the gasket normal to the faces of the gasket, said plate fitting between said facings and being thinner than said gasket material so that when the gasket and grommet are compressed between two members all pressure in the region immediately adjacent the grommet will bear against the annulus.

4. In a cylinder head gasket in which a sheet of asbestos contains combustion and coolant openings and oil and stud holes, with a row of stud holes closely adjacent one edge of the sheet, and in which metal facings disposed on the faces of the sheet contain openings and holes registered respectively with those in the sheet and in which said facings extend beyond the edge of the sheet adjacent said row of stud holes and contain a plurality of coolant perforations in said extending portions, a grommet comprising: a metal plate disposed between the extending portions of said facings and abutted against said edge of said sheet, said plate containing a plurality of perforations each registered with one of the perforations in said facings, and an elastomer element chemically bonded to the plate around each of said perforations therein and extending through the registered perforations in the facings and terminating in planes beyond the exposed faces of said facings, said plate being thinner than the minimum thickness to which the sheet is adapted to be compressed so that all pressures applied immediately adjacent the grommets will be on the elastomer elements.

5. A gasket as claimed in claim 4, in which the perforations in the extending portions of the facings are larger than the elastomer elements registered therewith, so that the elements project loosely through the perforations.

6. A gasket as claimed in claim 4, in which the planes wherein the elastomer elements terminate are parallel to each other and disposed equidistantly from the center of the plate and gasket.

7. A gasket as claimed in claim 4, in which the plate also contains holes with which smaller holes in the facings are registered and through which are extended hollow rivets that are smaller than the holes in the plate and thinner than the plate, which rivets draw the facings into the holes in the plate to secure the plate in the gasket.

8. A gasket as claimed in claim 4, in which the elastomer elements are chemically bonded to both faces of the plate and to the edges of the perforations therein and the tendency of the elements to move into the perforations as pressure is applied by studs in said row of stud holes is resisted solely by the bonds.

References Cited in the file of this patent

UNITED STATES PATENTS

| Number | Name | Date |
|---|---|---|
| 1,692,857 | Oven | Nov. 27, 1928 |
| 2,130,110 | Victor et al. | Sept. 13, 1938 |
| 2,191,044 | Seligman | Feb. 20, 1940 |
| 2,210,453 | Ginn | Aug. 6, 1940 |
| 2,395,243 | Aukers | Feb. 19, 1946 |

FOREIGN PATENTS

| Number | Country | Date |
|---|---|---|
| 237,307 | Great Britain | June 30, 1925 |